May 4, 1926.
A. NYDQVIST
1,583,736
HYDRAULIC POWER TRANSMISSION MECHANISM
Filed Oct. 10, 1925   2 Sheets-Sheet 1
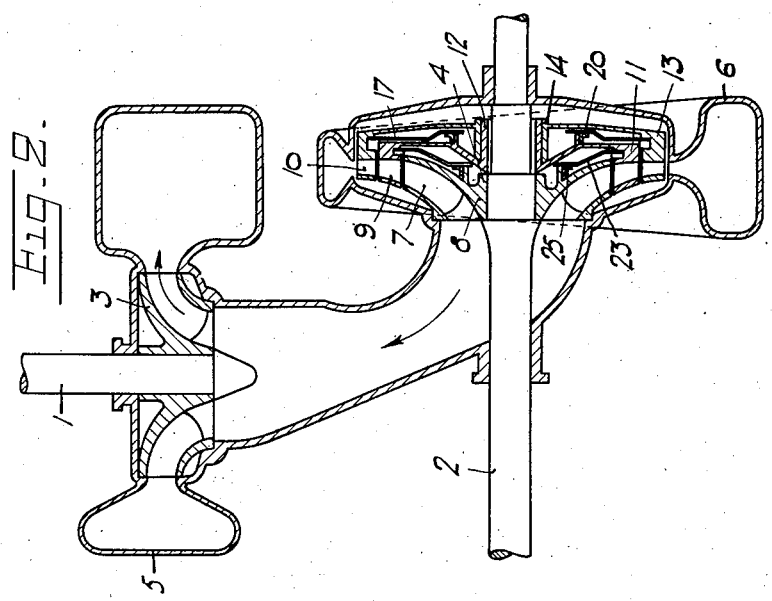
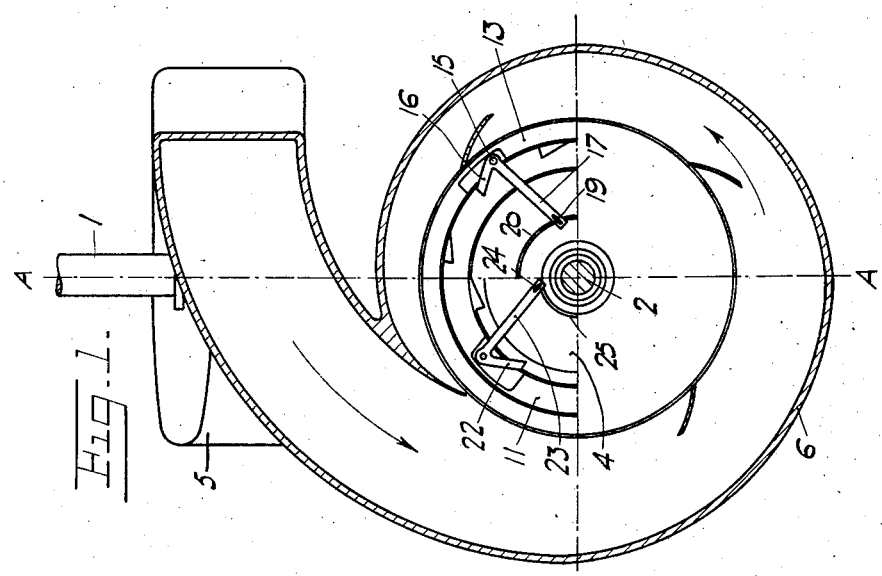
Inventor
Antenor Nydqvist,
By [signature]
atty.

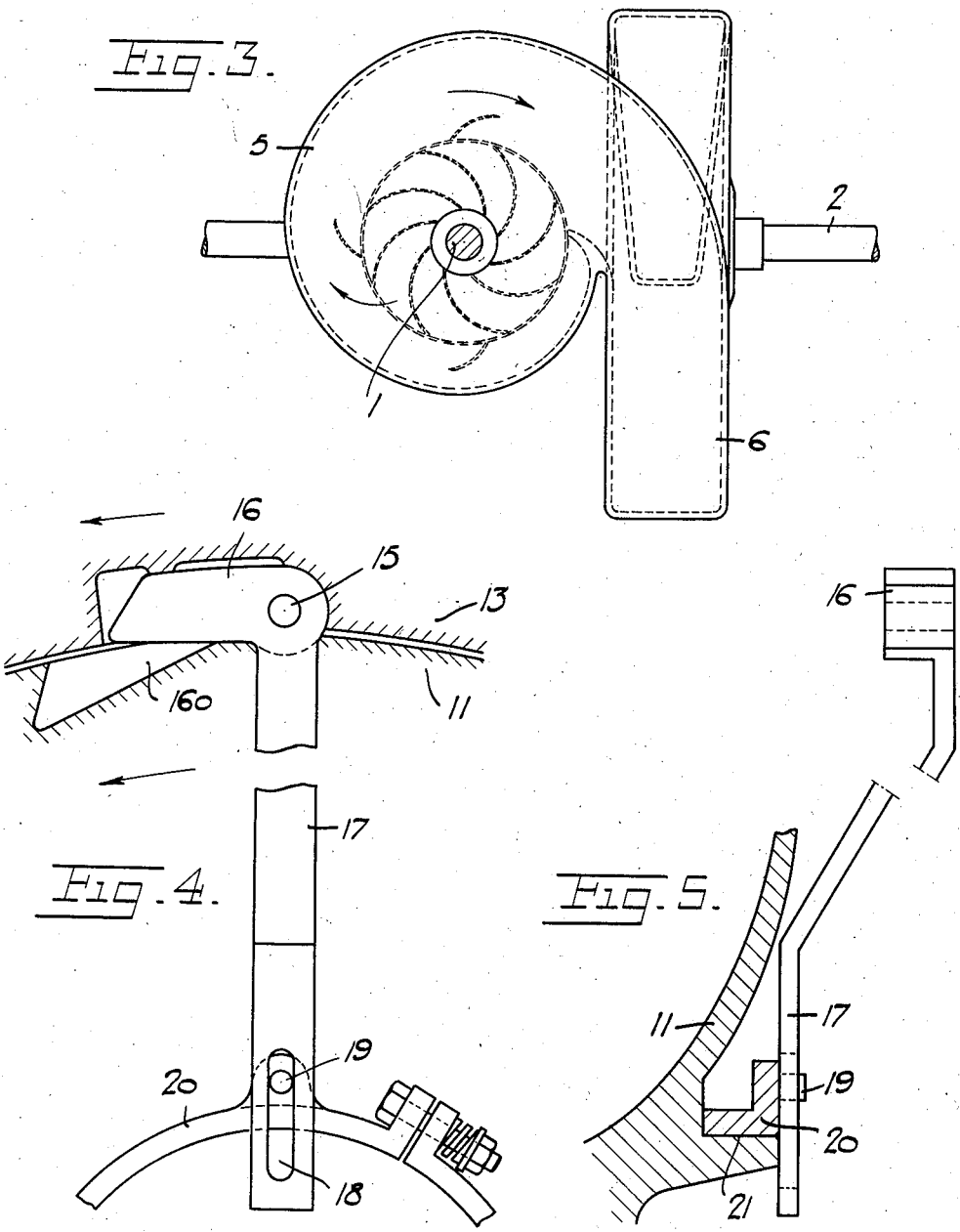

Patented May 4, 1926.

1,583,736

UNITED STATES PATENT OFFICE.

ANTENOR NYDQVIST, OF TROLLHATTAN, SWEDEN.

HYDRAULIC-POWER-TRANSMISSION MECHANISM.

Application filed October 10, 1925. Serial No. 61,711.

*To all whom it may concern:*

Be it known that I, ANTENOR NYDQVIST, a citizen of the Kingdom of Sweden, residing at Trollhattan, Sweden, have invented new and useful Improvements in Hydraulic-Power-Transmission Mechanisms, of which the following is a specification.

This invention relates to hydraulic power transmission mechanisms, as hydraulic transformers, turbines, pumps, compressors and the like, and more particularly to that type of such mechanisms having blade wheels including relatively rotatable sections which, in order to enable said relative rotation, are secured to preferably concentric rings, disks or the like which may rotate independently relatively to each other and to a common supporting shaft, or may be locked to said shaft to rotate therewith.

The present invention has for its object to provide means in connection with such blade wheels whereby the said movable blade sections may be automatically locked to the said common shaft and to each other or released therefrom depending on the relative angular velocity of said members resulting from the load on the mechanism, so that the mechanism may automatically adjust the turning moment produced by its rotor to correspond to the requirements at any load, in order that the highest efficiency of the mechanism may be obtained at every different load, and not, as in hitherto known designs, at a single definite load.

According to the invention the said means comprises pawls carried by one of each two adjacent relatively rotatable sections of a blade wheel and adapted to engage the other section of said two adjacent sections, said pawls being in frictional engagement with said other section so as to be caused to engage said other section, when the velocities of said two sections vary with respect to each other in the one direction, while being released from said engagement, when the said velocities vary in the opposite direction.

In the accompanying drawing, forming part of this specification, I have shown by way of example one constructional form of a hydraulic power transmission mechanism according to this invention.

Fig. 1 is a side elevation, partly in section, of said mechanism. Fig. 2 is a section on the line A—A, in Fig. 1. Fig. 3 is a top plan view. Fig. 4 is a front view, on a larger scale, of part of a turbine wheel of the mechanism of Figs. 1–3, showing the adjusting means for the movable blade portions of said wheel. Fig. 5 is a side elevation of the adjusting means shown in Fig. 4.

With reference to the drawing, the numeral 1, Figs. 1–3, indicates the driving shaft, and 2 is the driven shaft of a mechanism in which said shafts are at right angles to each other, though also other angles may be used.

The driving shaft 1 carries a centrifugal pump wheel 3 of the outward flow type, and the driven shaft 2 carries a turbine wheel of the inward flow type, indicated as a whole by the numeral 4. The pump wheel 3 and the turbine wheel 4 are surrounded by helical housings or chambers 5 and 6, respectively, connected mouth to mouth, so that the connection therebetween will form distributors for the respective wheels.

The blade system of the turbine wheel comprises an inner series of blade portions or sections 7 carried by a ring 8 keyed or otherwise fixed to the shaft 2, a mid-series of blade sections 9, and an outer series of blade sections 10, the series 9 being carried by a ring 11 the hub 12 of which is rotatably mounted on the shaft 2, while the series 10 are carried by another ring 13 the hub 14 of which is rotatably mounted on said hub 12.

Pivoted to the outermost blade ring 13 by means of journals or pins 15 (see also Fig. 4) are a series of pawls 16, one of which is indicated in Fig. 1 and more particularly illustrated in Figs. 4 and 5. An extension or lever 17 forming an angle to the pawl 16 projects inwards therefrom and is near its inner end formed with a longitudinal slot 18 engaged by a pin 19 projecting laterally from a ring 20 held by friction, though capable of rotating, on a cylindrical shoulder 21 formed on the mid-ring 11 on or near the hub thereof. The ring 11 is formed at its periphery with recesses 160 adapted to be engaged by the pawls 16.

A similar series of pawls 22, one of which is shown in Fig. 1, are carried by the mid-ring 11 and engaged at the inner end of their extensions or levers 23 by lateral pins 24 carried by a ring 25, Fig. 2, mounted on a cylindrical shoulder of the inner blade supporting ring 8. The inner blade ring 8 is formed with recesses similar to the recesses 100, to receive the pawls 22.

Before operation, the housings 5 and 6 are filled with a suitable liquid, as water.

In operation, the pump wheel 3 sucks in the liquid through its central inlet port and forces it outwardly so that the liquid will enter the spiral housing 6 of the turbine wheel 4 at great velocity causing the turbine wheel to rotate.

In normal operation, the middle blade ring 11 with its blades 9 will rotate at a speed lower than that of the inner blade ring 8 corresponding to its angle of inlet as well as to its diameter, and the outer blade ring 13 with its blades 10 will rotate at a still lower speed.

If, for any reason the speed of rotation of the inner blade ring 8 decreases to a value equal to or below that of the blade ring 11, the latter will be coupled to the blade ring 8 so as to rotate therewith as a unit. This is due to the fact that, in such change of the relative velocities of the blade rings 8 and 11, the ring 25 partaking in the rotation of the blade ring 8 due to the frictional engagement with the corresponding shoulder of blade ring 8 will cause the levers 23 engaged by the pins 24 to turn on their pivots till the pins 24 abut against the lower end of the slots of the respective levers 23 whereupon the ring 25 is caused to rotate at the same angular velocity as the blade ring 11, to hold the levers in their new position. By the described movement of the levers 23 the pawls 22 are brought into engagement with the corresponding recesses formed in the blade ring 8 thereby rigidly coupling the middle blade ring 11 to the inner blade ring 8.

If the common speed of rotation of the coupled elements 8 and 11 sinks down to or below that of the outer blade ring 13 the latter will be coupled to the blade ring 11 and the blade rings 8, 11 and 13 will thereupon form a single turbine wheel. The coupling of blade ring 13 to blade ring 11 is effected in a similar way to that described above in connection with the coupling of blade ring 11 to blade ring 8 and will be more nearly described hereinafter with reference to Figs. 4 and 5 of the drawing. When the speed of rotation of the coupled elements 8 and 11 is reduced, as above described, the ring 20 partaking in the rotation of the blade ring 11 due to frictional engagement with the shoulder 21 will rotate more slowly than the ring 13, and will thus cause the levers 17 engaged by the pins 19 to turn on their pins 15, till the pins 19 abut against the lower end of the respective slots 18, whereupon the ring 20 is caused to rotate at the same angular velocity as the blade ring 13, as may be readily understood from Fig. 4 in which the direction of rotation is indicated by arrows. The pawls 16 are thereby moved to a position in engagement with the recesses 160 of blade ring 11. The ring 13 will thereby rotate ring 11 at its own speed.

In this way the turning moments of blade rings 11 and 13 will be transmitted to the blade ring 8 and the shaft 2.

If, for any reason, the speed is increased, the outer blade ring 13 will first uncouple and then the middle blade ring 13 in an obvious way, whereupon the blade rings 11 and 13 will rotate at their own speeds independently of the speed of rotation of the inner blade ring 8, the turning moment of which only is now transmitted to the shaft 2.

As will appear from the above description the control of the coupling and uncoupling of members 11 and 13 with relation to member 8 is effected in a fully automatic manner.

It is to be noted that while in the construction shown, two freely movable blade wheel sections are shown, more than two such sections may be used, if desired.

What I claim is:

1. In a hydraulic power transmission mechanism, in combination, a blade wheel comprising relatively rotatable sections, and automatic means carried by one of each two adjacent sections to effect coupling and uncoupling of said sections with respect to each other under the control of the other adjacent section.

2. In a hydraulic power transmission mechanism, in combination, a blade wheel, comprising relatively rotatable concentric sections, and automatic means carried by the outer one of each two adjacent sections to effect coupling and uncoupling of said two adjacent sections with respect to each other under the control of the inner one of said sections.

3. In a hydraulic power transmission mechanism, in combination, a blade wheel, comprising relatively rotatable concentric sections, and means carried by one of each two adjacent sections to effect coupling and uncoupling of said adjacent sections with respect to each other, said means being in frictional engagement with the other one of said two adjacent sections for the purpose of effecting coupling, when the velocities of said two sections vary with respect to each other in the one direction, and uncoupling, when said velocities vary in the opposite direction.

4. In a hydraulic power transmission mechanism, in combination, a blade wheel, comprising relatively rotatable, concentric sections, pawls carried by one of each two adjacent sections to co-operate with the other one of said two adjacent sections, and a frictional connection between said pawls and said other section to bring said pawls into engagement with said other section, when the relative velocities of said two sections vary with respect to each other in the one direction, and to release the pawls from said other section when said velocities vary in the opposite direction.

In testimony whereof I have signed my name.

ANTENOR NYDQVIST.